United States Patent
Parsell

(10) Patent No.: US 11,591,163 B1
(45) Date of Patent: Feb. 28, 2023

(54) SWEEP AUGER SHIELD ASSEMBLY

(71) Applicant: Larry Parsell, Jerseyville, IL (US)

(72) Inventor: Larry Parsell, Jerseyville, IL (US)

( * ) Notice: Subject to any disclaimer, the term of this patent is extended or adjusted under 35 U.S.C. 154(b) by 0 days.

(21) Appl. No.: 17/463,958

(22) Filed: Sep. 1, 2021

(51) Int. Cl.
*B65G 21/20* (2006.01)
*B65G 65/46* (2006.01)

(52) U.S. Cl.
CPC ........ *B65G 21/2081* (2013.01); *B65G 65/466* (2013.01); *B65G 2201/042* (2013.01)

(58) Field of Classification Search
None
See application file for complete search history.

(56) References Cited

U.S. PATENT DOCUMENTS

| | | | | |
|---|---|---|---|---|
| 1,934,160 A | * | 11/1933 | Ballentine | A01D 61/008 56/122 |
| 2,159,663 A | | 5/1939 | Lindgren | |
| 2,696,290 A | * | 12/1954 | Carroll | A01D 61/008 198/720 |
| 2,763,362 A | * | 9/1956 | Greaves | B65G 65/466 198/671 |
| 2,790,563 A | * | 4/1957 | McCarthy | B65G 65/466 414/312 |
| 2,856,936 A | | 10/1958 | Landrum | |
| 2,955,720 A | * | 10/1960 | Jones | A01F 25/2018 414/308 |
| 3,105,586 A | * | 10/1963 | Carew | B65G 69/0433 198/530 |
| 3,240,401 A | * | 3/1966 | Kirschmann | B65G 65/46 222/311 |
| 3,434,605 A | * | 3/1969 | Yung | A01F 25/2018 414/311 |
| 3,468,112 A | * | 9/1969 | Landgrebe | A01D 89/00 56/364 |
| 3,486,643 A | * | 12/1969 | Smith | B65G 65/466 414/312 |
| 3,581,916 A | * | 6/1971 | Brumagim | B65G 65/466 414/308 |
| 3,743,117 A | * | 7/1973 | Frezzo | A01G 18/62 414/312 |
| 3,750,807 A | * | 8/1973 | Jackson | A01F 25/2018 414/808 |
| 3,769,988 A | | 11/1973 | Burenga | |
| 3,785,472 A | * | 1/1974 | Mathews | B65G 17/42 198/733 |
| 3,945,512 A | * | 3/1976 | Pannell | A01G 18/62 47/1.1 |
| 3,981,125 A | * | 9/1976 | Kerber | A01D 41/14 56/208 |

(Continued)

FOREIGN PATENT DOCUMENTS

FR 2517285 A * 6/1983 .......... B65G 65/466
FR 2611681 A1 * 3/1987
(Continued)

*Primary Examiner* — Joseph A Dillon, Jr.

(57) ABSTRACT

A sweep auger shield assembly for inhibiting grain from being spilled over a sweep auger in a grain bin includes a sweep auger that has a back shield which is coupled to the sweep auger. An extension shield is provided that is mountable to the back shield of the sweep auger. Thus, the extension shield increases the overall height of the back shield. In this way the extension shield inhibits grain from passing over the back shield when the sweep auger is removing grain from a floor of a grain bin.

6 Claims, 5 Drawing Sheets

(56) References Cited

U.S. PATENT DOCUMENTS

| | | | | |
|---|---|---|---|---|
| 4,008,816 | A | * | 2/1977 | Harrison .............. B65G 65/466 366/186 |
| 4,029,219 | A | * | 6/1977 | Rutten ................. B65G 65/466 414/308 |
| 4,313,705 | A | * | 2/1982 | Jackson ............... B65G 65/466 198/669 |
| 4,619,577 | A | * | 10/1986 | Swanson ............. B65G 65/466 414/312 |
| 4,626,161 | A | * | 12/1986 | Olson .................. B65G 65/466 414/308 |
| 4,717,308 | A | * | 1/1988 | Kuhns ...................... B60P 1/42 414/326 |
| 4,875,820 | A | * | 10/1989 | Lepp ...................... B65G 33/32 198/615 |
| 5,960,932 | A | * | 10/1999 | Adams ................ B65G 65/466 198/666 |
| 6,039,647 | A | * | 3/2000 | Weikel ................ B65G 65/466 460/119 |
| 6,254,329 | B1 | * | 7/2001 | Sukup ................. B65G 65/466 414/311 |
| 6,524,183 | B1 | | 2/2003 | Van Quekelberghe |
| 6,948,902 | B2 | * | 9/2005 | Hanig .................. B65G 65/466 414/326 |
| 7,004,305 | B2 | * | 2/2006 | Schaefer ............. B65G 65/466 198/674 |
| 7,297,051 | B1 | | 11/2007 | Schmidt |
| 7,857,120 | B1 | * | 12/2010 | Perring ................. B65G 33/24 198/671 |
| 7,967,542 | B2 | * | 6/2011 | Epp ...................... B65G 65/466 414/311 |
| D693,372 | S | * | 11/2013 | Luster ............................ D15/10 |
| 2006/0285942 | A1 | * | 12/2006 | Fridgen ................ B65G 65/466 414/133 |
| 2013/0115031 | A1 | * | 5/2013 | Trame ................. B65G 65/466 318/5 |

FOREIGN PATENT DOCUMENTS

| | | | | |
|---|---|---|---|---|
| FR | 3057560 | B1 | * 10/2018 | .......... B65G 65/466 |
| GB | 1570690 | A | * 7/1980 | .......... B65G 65/466 |
| WO | WO02087313 | | 11/2002 | |
| WO | WO-2017009522 | A1 | * 1/2017 | ............ A01D 57/30 |

\* cited by examiner

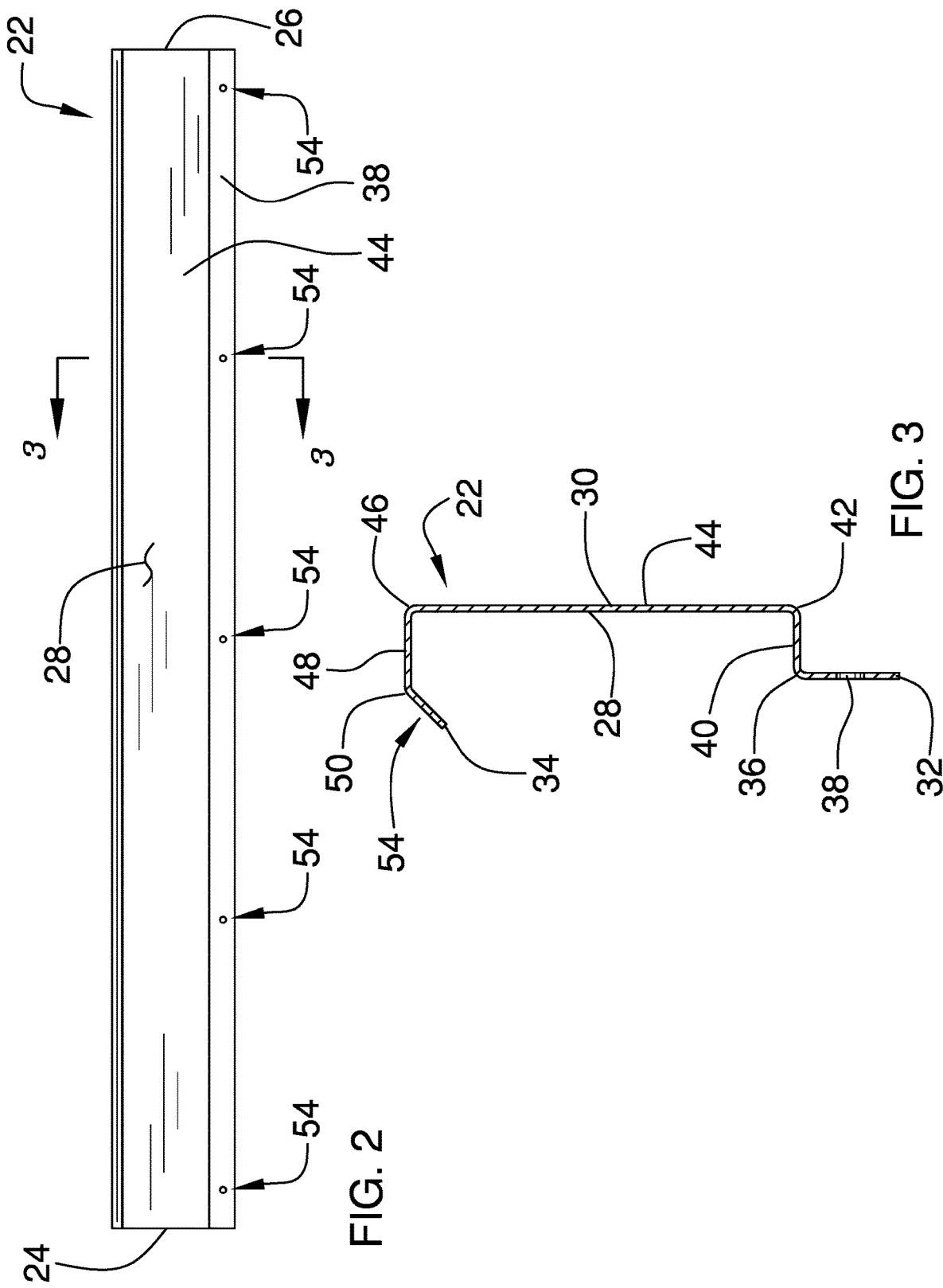

SWEEP AUGER SHIELD ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to shield devices and more particularly pertains to a new shield device for inhibiting grain from being spilled over a sweep auger in a grain bin. The device includes a back shield that is mounted to a sweep auger and an extension shield that is mountable to the back shield. In this way the extension shield increases the overall height of the back shield. Thus, the extension shield deflects grain back into the sweep auger that would otherwise pass over the back shield. In this way the grain does not collect on the floor of the grain bin while the sweep auger is collecting the grain.

(2) Description of Related Art Including Information Disclosed Under 37 CFR 1.97 and 1.98.

The prior art relates to shield devices including a grain screen that is integrated into a feeder chute of a grain harvester. The prior art discloses a foraminous screen for a peanut harvester. The prior art discloses a legume harvester that includes a series of augers and chutes for harvesting legumes. The prior art discloses a concave pan that is mountable beneath a conveyor of a grain harvester for collecting tailings from grain harvesting. The prior art discloses a thresher separator for a combine harvester that includes a foraminous drum.

BRIEF SUMMARY OF THE INVENTION

An embodiment of the disclosure meets the needs presented above by generally comprising a sweep auger that has a back shield which is coupled to the sweep auger. An extension shield is provided that is mountable to the back shield of the sweep auger. Thus, the extension shield increases the overall height of the back shield. In this way the extension shield inhibits grain from passing over the back shield when the sweep auger is removing grain from a floor of a grain bin.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of an extension shield of an embodiment of the disclosure.

FIG. 3 is a cross sectional view taken along line 3-3 of FIG. 2 of an embodiment of the disclosure.

DETAILED DESCRIPTION OF THE INVENTION

Figure 1:
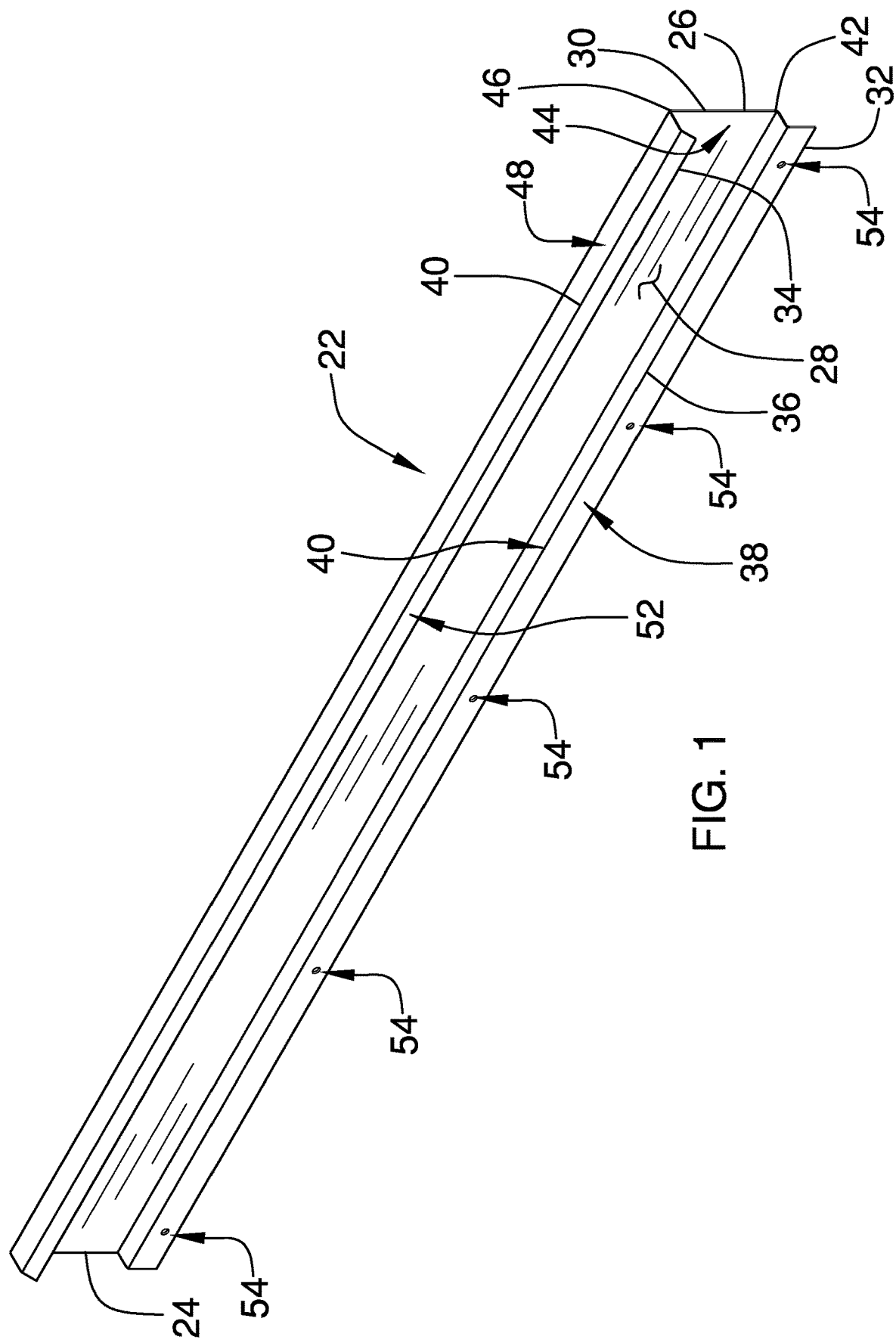
FIG. 1 is a front perspective view of an extension shield of a sweep auger shield assembly according to an embodiment of the disclosure.
Figure 4:
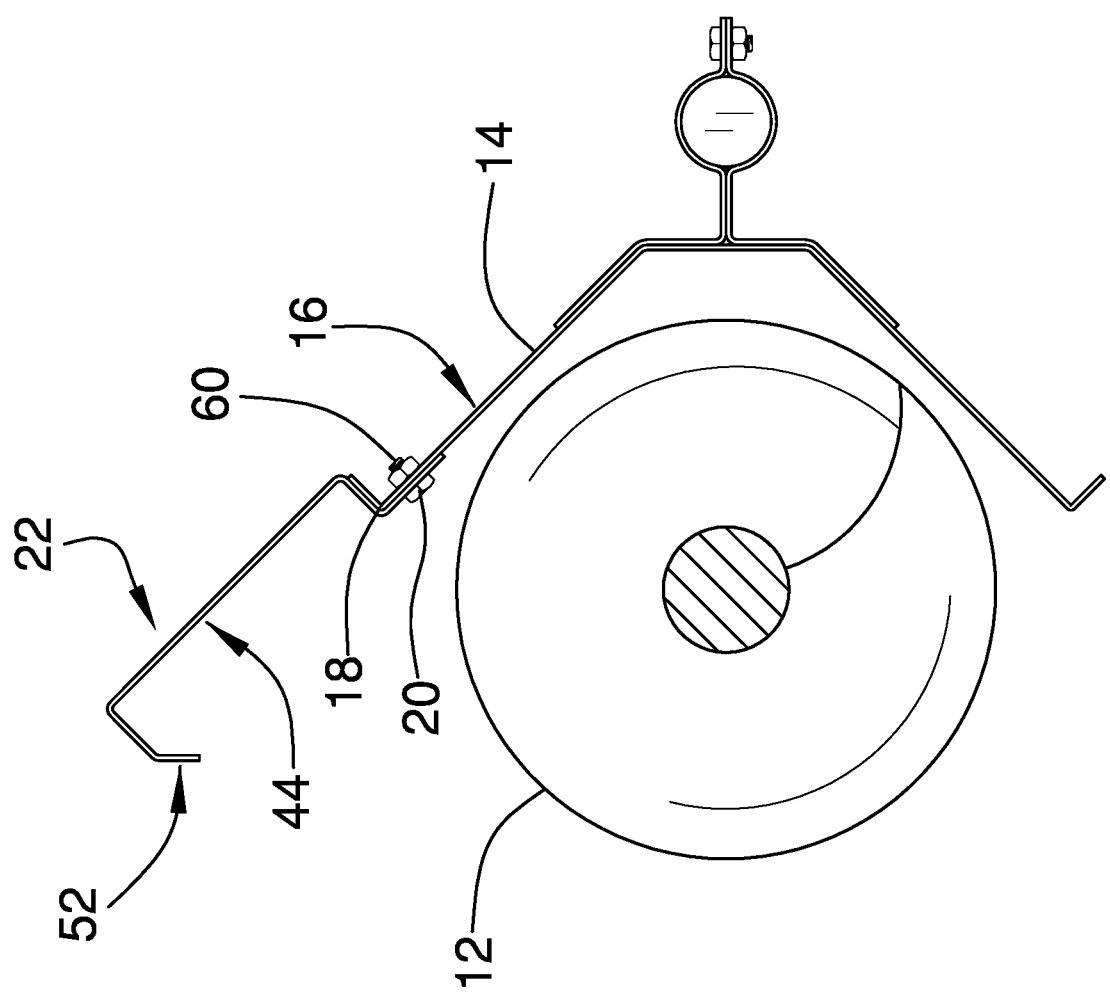
FIG. 4 is a right side view of an embodiment of the disclosure.
Figure 5:
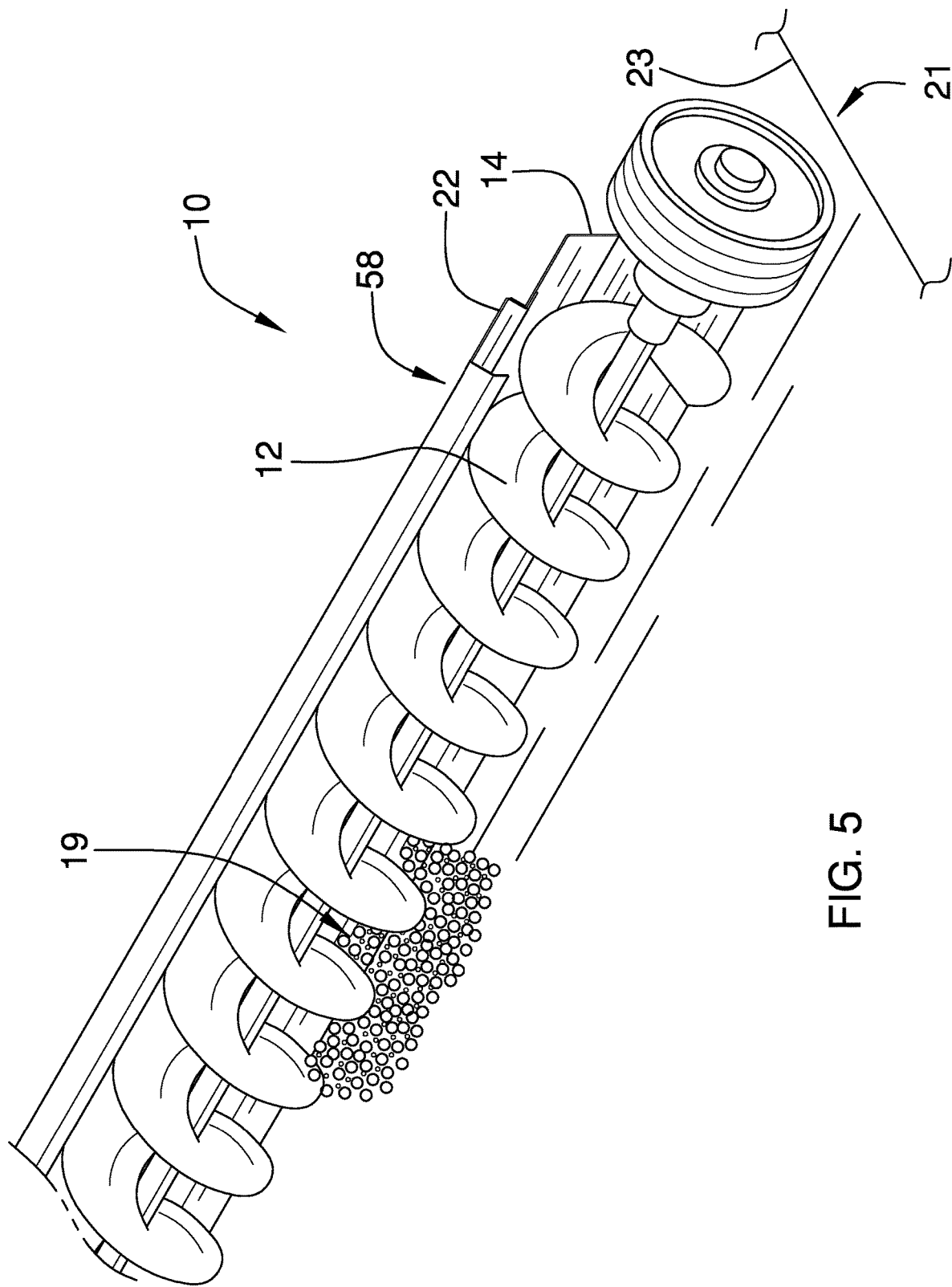
FIG. 5 is a perspective view of an embodiment of the disclosure.
Figure 6:
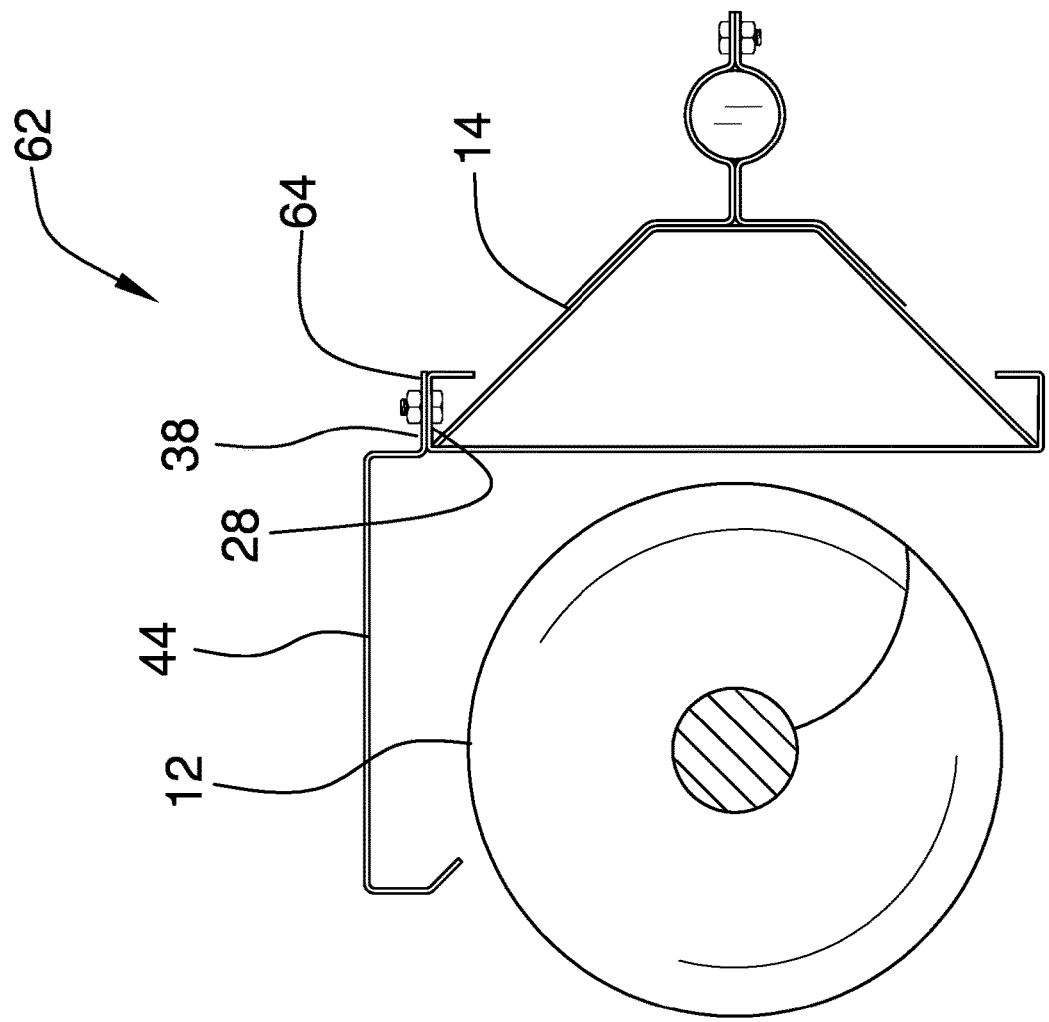
FIG. 6 is a perspective view of an alternative embodiment of the disclosure.

With reference now to the drawings, and in particular to FIGS. 1 through 6 thereof, a new shield device embodying the principles and concepts of an embodiment of the disclosure and generally designated by the reference numeral 10 will be described.

As best illustrated in FIGS. 1 through 6, the sweep auger shield assembly 10 generally comprises a sweep auger 12 that has a back shield 14 which is coupled to the sweep auger 12. The back shield 14 has a vertical portion 16 that is oriented to extend upwardly from the sweep auger 12, and the vertical portion 16 has a top edge 18 and a forward surface 20. The sweep auger 12 may be a sweep auger 12 that is commonly employed in a grain bin 21 to sweep grain 19 from a floor 23 of the grain bin 21. An extension shield 22 is mountable to the back shield 14 of the sweep auger 12 such that the extension shield 22 increases the overall height of the back shield 14. In this way the extension shield 22 inhibits grain 19 from passing over the back shield 14 when the sweep auger 12 is removing grain 19 from the floor 23 of the grain bin 21.

The extension shield 22 has a first end 24 and a second end 26, and the extension shield 22 is elongated between the first end 24 and the second end 26. The extension shield 22 has a front surface 28 extending between the first end 24 and the second end 26, and the extension shield 22 has a back surface 30 extending between the first end 24 and the second end 26. Additionally, the extension shield 22 has a bottom edge 32 extending between the first end 24 and the second end 26, and the extension shield 22 has a top edge 34 extending between the first end 24 and the second end 26. The extension shield 22 is comprised of a rigid material, such as steel or the like, to deflect grain 19 that is swept by the sweep auger 12. The extension shield 22 may have a length ranging between approximately 40.0 inches and 50.0 inches and the extension shield 22 may have a height ranging between approximately 5.0 inches and 7.0 inches.

The extension shield 22 has a first bend 36 extending between the first end 24 and the second end 26 to define a first mounting portion 38 and a second mounting portion 40 that are oriented at an angle with each other. The first bend 36 is spaced from the bottom edge 32 and the first bend 36 is oriented parallel to the bottom edge 32. Each of the first mounting portion 38 and the second mounting portion 40 may have a width of approximately 0.75 inches. The extension shield 22 has a second bend 42 extending between the first end 24 and the second end 26 to define a medial portion 44 forming an angle with the second mounting portion 40. The second bend 42 is oriented parallel with the first bend 36 and the medial portion 44 lies on a plane that is oriented parallel with the first mounting portion 38. The medial portion 44 is spaced rearwardly from the first mounting portion 38 such that the second mounting portion 40 extends between the first mounting portion 38 and the medial portion 44. Furthermore, the medial portion 44 may have a height of approximately 4.0 inches.

The extension shield 22 has a third bend 46 extending between the first end 24 and the second end 26 to define an upper portion 48 forming an angle with the medial portion 44. The third bend 46 is oriented parallel with the second bend 42. Additionally, the upper portion 48 lies on a plane that is oriented parallel with the second mounting portion 40 having the upper portion 48 extending forwardly from the medial portion 44. The upper portion 48 may have a width of approximately 1.0 inches.

The extension shield 22 has a fourth bend 50 extending between the first end 24 and the second end 26 to define an angled portion 52 forming an angle with the upper portion 48. The angled portion 52 angles away from the medial portion 44 such that the top edge 18 of the extension shield 22 is directed downwardly toward the bottom edge 32 of the extension shield 22. The extension shield 22 has a plurality of mounting holes 54 each extending through the front surface 28 and the back surface 30 of the extension shield 22. Each of the mounting holes 54 is positioned on the first mounting portion 38 and the mounting holes 54 are spaced apart from each other and are distributed between the first end 24 and the second end 26.

The back surface 30 corresponding to the first mounting portion 38 rests against the forward surface 20 of the vertical portion 16 of the back shield 14 on the sweep auger 12 such that the top edge 18 of the vertical portion 16 abuts the second mounting portion 40. Moreover, the medial portion 44 lies on a plane that is oriented parallel with the vertical portion 16 of the back shield 14 such that the angled portion 52 of the extension shield 22 is directed toward the sweep auger 12. In this way the medial portion 44 deflects grain 19 that is directed rearwardly from the sweep auger 12. Additionally, the angled portion 52 of the extension shield 22 deflects grain 19 that is directed upwardly from the sweep auger 12. Each of the medial portion 44 and the angled portion 52 defines a barrier 58 to inhibit grain 19 that is directed rearwardly from the sweep auger 12 from collecting on the floor 23 of the grain bin 21. In this way the sweep auger 12 can more efficiently sweep the grain 19 from the floor 23 of the grain bin 21 such that the grain 19 is inhibited from making the floor 23 unsafe to walk upon.

A plurality of fasteners 60 is provided and each of the fasteners 60 is extendable through a respective one of the mounting holes 54. Each of the fasteners 60 engages the vertical portion 16 of the back shield 14 for attaching the extension shield 22 to the back shield 14. Additionally, each of the fasteners 60 may comprise a nut and a bolt or other type of releasable, mechanical fastener. In an alternative embodiment 62 as is most clearly shown in FIG. 6, the back shield 14 may have a horizontal portion 64 with respect to the sweep auger 12 and the front surface 28 corresponding to the first mounting portion 38 may be positioned on top of the horizontal portion 64. In this way the medial portion 44 of the extension shield 22 extends forwardly over the top of the sweep auger 12.

In use, the extension shield 22 is mounted to the back shield 14 of the sweep auger 12. In this way the extension shield 22 deflects grain 19 back into the sweep auger 12 that would otherwise pass over the back shield 14 and collect on the floor 23 of the grain bin 21. Thus, the sweep auger 12 can more efficiently remove the grain 19 from the floor 23 of the grain bin 21. Moreover, the extension shield 22 inhibits the grain 19 that would otherwise pass over the back shield 14 from making walking on the floor 23 of the grain bin 21 unsafe for a worker that is supervising the operation of the sweep auger 12. In this way the worker can safely walk on the floor 23 of the grain bin 21 without falling down and potentially being injured by the sweep auger 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sweep auger shield assembly for inhibiting grain from passing over a sweep auger when the sweep auger is removing grain from a floor of a grain bin, said assembly comprising:

a sweep auger having a back shield being coupled to said sweep auger;

an extension shield being mountable to said back shield of said sweep auger such that said extension shield increases the overall height of said back shield wherein said extension shield is configured to inhibit grain from passing over said back shield when said sweep auger is removing grain from a floor of a grain bin;

wherein said extension shield has a first end and a second end, said extension shield being elongated between said first end and said second end, said extension shield having a front surface extending between said first end and said second end, said extension shield having a back surface extending between said first end and said second end, said extension shield having a bottom edge extending between said first end and said second end, said extension shield having a top edge extending between said first end and said second end, said extension shield being comprised of a rigid material wherein said extension shield is configured to deflect grain being swept by said sweep auger;

wherein said extension shield has a first bend extending between said first end and said second end to define a first mounting portion and a second mounting portion being oriented at an angle with each other, said first bend being spaced from said bottom edge, said first bend being oriented parallel to said bottom edge;

wherein said extension shield has a second bend extending between said first end and said second end to define a medial portion forming an angle with said second mounting portion, said second bend being oriented parallel with said first bend, said medial portion lying on a plane being oriented parallel with said first mounting portion, said medial portion being spaced rearwardly from said first mounting portion such that said second mounting portion extends between said first mounting portion and said medial portion; and wherein said extension shield has a third bend extending between said first end and said second end to define an upper portion forming an angle with said medial portion, said third bend being oriented parallel with said second bend, said upper portion lying on a plane being oriented parallel with said second mounting portion having said upper portion extending forwardly from said medial portion.

2. The assembly according to claim 1, wherein said extension shield has a fourth bend extending between said first end and said second end to define an angled portion forming an angle with said upper portion, said angled portion angling away from said medial portion such that said top edge of said extension shield is directed downwardly toward said bottom edge of said extension shield.

3. The assembly according to claim 1, wherein said extension shield has a plurality of mounting holes each extending through said front surface and said back surface of said extension shield, each of said mounting holes being positioned on said first mounting portion, said mounting holes being spaced apart from each other and being distributed between said first end and said second end.

4. A sweep auger shield assembly for inhibiting grain from passing over a sweep auger when the sweep auger is removing grain from a floor of a grain bin, said assembly comprising:

a sweep auger having a back shield being coupled to said sweep auger;

an extension shield being mountable to said back shield of said sweep auger such that said extension shield increases the overall height of said back shield wherein said extension shield is configured to inhibit grain from passing over said back shield when said sweep auger is removing grain from a floor of a grain bin;

wherein said extension shield has a first end and a second end, said extension shield being elongated between said first end and said second end, said extension shield having a front surface extending between said first end and said second end, said extension shield having a back surface extending between said first end and said second end, said extension shield having a bottom edge extending between said first end and said second end, said extension shield having a top edge extending between said first end and said second end, said extension shield being comprised of a rigid material wherein said extension shield is configured to deflect grain being swept by said sweep auger;

wherein said extension shield has a first bend extending between said first end and said second end to define a first mounting portion and a second mounting portion being oriented at an angle with each other, said first bend being spaced from said bottom edge, said first bend being oriented parallel to said bottom edge;

wherein said extension shield has a plurality of mounting holes each extending through said front surface and said back surface of said extension shield, each of said mounting holes being positioned on said first mounting portion, said mounting holes being spaced apart from each other and being distributed between said first end and said second end;

wherein said back shield has a vertical portion being oriented to extend upwardly from said sweep auger, said vertical portion having a top edge and a forward surface;

wherein said extension shield has a second mounting portion; and wherein said back surface corresponding to said first mounting portion rests against said forward surface of said vertical portion of said back shield on said sweep auger such that said top edge of said vertical portion abuts said second mounting portion.

5. The assembly according to claim 4, wherein:

said extension shield has an angled portion;

said medial portion lies on a plane being oriented parallel with said vertical portion of said back shield such that said angled portion of said extension shield is directed toward said sweep auger wherein said medial portion is configured to deflect grain that is directed rearwardly from said sweep auger and wherein said angled portion of said extension shield is configured to deflect grain that is directed upwardly from said sweep auger; and wherein each of said medial portion and said angled portion defines a barrier wherein said barrier is configured to inhibit grain that is directed rearwardly from said sweep auger from collecting on the floor of the grain bin.

6. A sweep auger shield assembly for inhibiting grain from passing over a sweep auger when the sweep auger is removing grain from a floor of a grain bin, said assembly comprising:

a sweep auger having a back shield being coupled to said sweep auger, said back shield having a vertical portion being oriented to extend upwardly from said sweep auger, said vertical portion having a top edge and a forward surface;

an extension shield being mountable to said back shield of said sweep auger such that said extension shield increases the overall height of said back shield wherein said extension shield is configured to inhibit grain from passing over said back shield when said sweep auger is removing grain from a floor of a grain bin, said extension shield having a first end and a second end, said extension shield being elongated between said first end and said second end, said extension shield having a front surface extending between said first end and said second end, said extension shield having a back surface extending between said first end and said second end, said extension shield having a bottom edge extending between said first end and said second end, said extension shield having a top edge extending between said first end and said second end, said extension shield being comprised of a rigid material wherein said extension shield is configured to deflect grain being swept by said sweep auger, said extension shield having a first bend extending between said first end and said second end to define a first mounting portion and a second mounting portion being oriented at an angle with each other, said first bend being spaced from said bottom edge, said first bend being oriented parallel to said bottom edge, said extension shield having a second bend extending between said first end and said second end to define a medial portion forming an angle with said second mounting portion, said second bend being oriented parallel with said first bend, said medial portion lying on a plane being oriented parallel with said first mounting portion, said medial portion being spaced rearwardly from said first mounting portion such that said second mounting portion extends between said first mounting portion and said medial portion, said extension shield having a third bend extending between said first end and said second end to define an upper portion forming an angle with said medial portion, said third bend being oriented parallel with said second bend, said upper portion lying On a plane being oriented parallel with said second mounting portion having said upper portion extending forwardly from said medial portion, said extension shield having a fourth bend extending between said first end and said second end to define an angled portion forming an angle with said upper portion, said angled portion angling away from said medial portion such that said top edge of said extension shield is directed downwardly toward said bottom edge of said extension shield, said extension shield having a plurality of mounting holes each extending through said front surface and said back surface of said extension shield, each of said mounting holes being positioned on said first mounting portion, said mounting holes being spaced apart from each other and being distributed between said first end and said second end, said back surface corresponding to said first mounting portion resting against said forward surface of said vertical portion of said back shield on said sweep auger such that said top edge of said vertical portion abuts said second mounting portion, said medial portion lying on a plane being oriented parallel with said vertical portion of said back shield such that said angled portion of said extension shield is directed toward said sweep auger wherein said medial portion is configured to deflect grain that is directed rearwardly from said sweep auger and wherein said angled portion of said extension shield is configured to deflect grain that is directed upwardly from said sweep auger, wherein each of said medial portion and said angled portion defines a barrier wherein said barrier is configured to inhibit grain that is directed rearwardly from said sweep auger from collecting on the floor of the grain bin; and a plurality of fasteners, each of said fasteners being extendable through a respective one of said mounting holes and engaging said vertical portion of said back shield for attaching said extension shield to said back shield.

* * * * *